United States Patent [19]

David

[11] Patent Number: 4,629,160
[45] Date of Patent: Dec. 16, 1986

[54] SHUTOFF WEDGE FOR SHUTOFF VALVE

[75] Inventor: Walfried David, Maxdorf, Fed. Rep. of Germany

[73] Assignee: Bopp & Reuther GmbH, Mannheim, Fed. Rep. of Germany

[21] Appl. No.: 679,014

[22] Filed: Dec. 6, 1984

[30] Foreign Application Priority Data

Dec. 14, 1983 [DE] Fed. Rep. of Germany ....... 3345133

[51] Int. Cl.$^4$ ........................ F16K 3/314; F16K 3/316
[52] U.S. Cl. .................................... 251/327; 251/326; 251/368
[58] Field of Search ........................ 251/326, 327, 368; 137/375

[56] References Cited

U.S. PATENT DOCUMENTS 3,662,778  5/1972  Leopold, Jr. et al. .......... 251/326 X
3,763,880  10/1972 Leopold, Jr. et al. .......... 251/326 X
4,532,957  8/1985  Battle et al. ..................... 137/375

Primary Examiner—Arnold Rosenthal
Attorney, Agent, or Firm—Michael J. Striker

[57] ABSTRACT

A shutoff wedge for a shutoff valve has a U-shaped sliding shoe of synthetic plastic material with good sliding properties, high wear resistance, and sufficient temperature strength, which is inserted in guiding grooves of the shutoff wedge which is sealingly enclosed by a rubber elastic jacket up to the sliding faces abutting against guiding strips of a shutoff valve housing. A method of anchoring of the synthetic plastic sliding shoe and a mold therefor are also provided.

14 Claims, 13 Drawing Figures

SHUTOFF WEDGE FOR SHUTOFF VALVE

BACKGROUND OF THE INVENTION

The present invention relates to a shutoff wedge for a shutoff valve, which is displaceable in a valve housing transverse to a flow direction, carries at its both small sides guiding grooves engaging with guiding projections of the valve housing and in which a row cast iron body is provided with rubber elastic jacket whose sealing face portion lies in the closed position of the valve elastically against seat faces of the valve housing.

In known weak-tight valves, not only relatively thick-walled elastic sealing strand abutting against the housing seat face is rubberized in the region of the sealing faces on the cast iron shutoff wedge, but also the remaining surface of the shutoff wedge is provided at its all sides with a rubber elastic jacket. Thereby the thick sealing face portion is held firm on the shutoff wedge and the shutoff wedge is corrosion protected on its entire surface. The sliding faces of the guide grooves are not rubberized, and thereby they form together with the guiding projections of the valve housing, a relatively friction free sliding guide.

With mounting of such shutoff valves in drinking water conduits it has been recognized that in the iron guiding grooves of the shutoff wedge rust can take place, and therefore again a transition was made to rubberize the sliding faces of the guiding grooves. Such a rubber elastic coating in the guiding grooves of the shutoff wedge possess however poor sliding properties and is subjected to very high wear. Therefore, on the one hand because of the high friction, high shaft forces are necessary, and on the other hand, the wedge guide is worn very fast.

SUMMARY OF THE INVENTION

Accordingly, it is an object of the present invention to provide a shutoff wedge which over its entire surface, or in other words also in the region of the wedge guide is reliably protected from corrosion and despite this also has a good sliding guide which requires only low torque for the shaft actuation and is especially wear strong.

In keeping with these objects and with others which will become apparent hereinafter, one feature of the present invention resides, briefly stated, in a shutoff wedge which has a U-shaped sliding shoe of a synthetic plastic material with high sliding properties, high wear resistance and sufficient temperature resistance inserted in guiding grooves of a shutoff wedge which to its sliding faces abutting against the guiding projections of the housing is tightly surrounded by a rubber elastic jacket.

Since the U-shaped sliding shoe is firmly inserted in the guiding grooves of the shutoff wedge and composed of a synthetic plastic material with good sliding properties, high wear strength and sufficient temperature resistance, for instance polyamide, the shutoff wedge obtains not only a reliable corrosion protection also in the region of the wedge guide, but is simultaneously provided with a sufficient sliding guide which is characterized by an especially low friction resistance and minimal wear.

Especially with the use of the sliding shoes of polyamide 6.6, the pair with the guiding projections of the cast and treated against corrosion valve housing has the smallest possible sliding wear and its sliding friction coefficient is very low. Polybutylene is suitable as synthetic plastic material for the sliding shoes since it has a high wear strength and good sliding property. This synthetic plastic material exhibits a low water absorption and a low swelling property.

If the sliding shoes are tightly surrounded, up to their outwardly freely located sliding surfaces, by the rubber elastic jacket of the shutoff wedge, a seamless tight and therefore corrosion protective transition is provided from both sliding shoes in the rubber elastic jacket of the shutoff wedge. The above-mentioned synthetic plastic material possesses a good resistance against high temperatures which take place for short times, so that the sliding shoes produced from these materials can withstand temperatures of for example 170°–180° C. during spraying of the rubber elastic jacket over short times.

In accordance with another feature of the invention, both U-shaped synthetic plastic sliding shoes are inserted in the guiding grooves with a gap at both sides and anchoring of the sliding shoes with the shutoff valve is performed by filling of the remaining hollow space with the spraying mass of vulcanized rubber elastic jacket. Because of these features, the synthetic plastic sliding shoes are connected with the shutoff wedge in an especially simple manner and maintain simultaneously an elastic embedding, so that slight tilting of the shutoff valve from the wedge sliding guide can be absorbed. Moreover, the guiding grooves of the shutoff wedge can be retained raw cast and the casting tolerances can be compensated by a respective fixed holding of the sliding shoes prior to the spraying around. With raw cast a further improved adhesion of the rearwardly sprayed holding layer takes place.

In accordance with still another feature of the invention, the bottom and/or the lateral walls of the synthetic plastic sliding shoes are provided on the outer side with a number of holding ribs extending transversely to the sliding guide longitudinal axis. Thereby the sliding shoes are firmly anchored in the sprayed rubber elastic synthetic plastic material and pushing forces which are transmitted during actuation of the valve shaft to the wedge guide of the shutoff wedge can be absorbed.

An especially simple anchoring of the synthetic plastic sliding shoe in the guiding grooves of the shutoff wedge is provided when the synthetic plastic sliding shoes are first glued on holding strips of the spraying mold for bringing of the rubber elastic jacket, then the raw shutoff wedge is displaced with its guiding grooves over the sliding shoe of a smaller cross-section and subsequently the hollow space between the outer surface of the sliding shoes and guiding grooves during the spraying of the rubber jacket is simultaneously filled by the spraying mass.

Since the rear spraying of the sliding shoe and the spraying of the jacket is performed at the same time in one working step with the same spraying mass, it is not necessary to have a special working step and it is not necessary to have additional holding means for mounting of the sliding shoes on the shutoff valve. After the end of the vulcanization process required for the jacket, both sliding shoes are firmly anchored in the shutoff wedge. Since the synthetic rubber for the rubber jacket of the shutoff wedge is conventionally sprayed with 200 bar or more into the mold, it is guaranteed that the sliding shoes are filled at all locations porefree by the spraying mass. Thereby a closed rubber elastic layer between sliding shoes and the shutoff wedge is produced, it provides firm and durable connection with the sliding shoes.

The firm and durable connection between the sliding shoes and the elastomer is guaranteed when the synthetic plastic sliding shoes, prior to the insertion into the spraying mold, are cleaned and/or stained and provided with a respective adhesive agent.

The sliding shoes can have in the region of the holding ribs rounded and/or inclined transition. Thereby the filling spraying mass of the rubber elastic jacket better flows around the holding transverse ribs and abuts completely and in a pore free manner against the sliding shoe outer surface.

In the event of great valve nominal width which can reliably take up the thrust forces acting on the sliding shoes, the intermediate space between the holding transverse ribs of the synthetic plastic sliding shoes can be formed as dove-tail shaped undercuts. The rubber elastic material penetrates completely into the dove-tail shaped undercuts and acts there as a non-releasable toothing of the sliding shoes with the rubber elastic holding layer.

It is advantageous when in the bottom center of the guiding grooves a cast small longitudinal groove is provided to form a supply passage for the spraying mass of the sliding shoe. By this supply passage it is guaranteed that the hollow space which remains between the sliding shoes and the guiding grooves of the shutoff wedge is completely filled with the spraying mass, even when the sliding shoes are provided on their outer side with a number of holding transverse ribs.

The synthetic plastic sliding shoes can be provided on the inner longitudinal edges with clamping grooves which advantageously have a cross-section slightly exceeding a semi-circle. Thereby a simple position fixation of the sliding shoes during the rear spraying is possible. The sliding shoes, prior to spraying of the rubber elastic jacket, are snappingly pressed into respective projections of the spraying and vulcanizing mold.

It is advantageous to provide the row shutoff wedge on its one wide side with advantageously three cast centering blind holes. These centering blind holes guaranty that the shutoff wedge inserted in the spraying mold is retained in the correct position, so that the sliding shoes inserted prior to the spraying into the mold lie so that they engage in both guiding grooves of the shutoff wedge with a desired gap.

An exact position of the sliding shoes relative to the row shutoff wedge is guaranteed when a lower mold shell is provided with centering pins in which the centering blind bore of the row shutoff wedge engage. The flat abutment of the row shutoff wedge against the lower mold shell, the shutoff wedge is reliably fixed and by the definite position of the holding projection provided in the spraying mold the sliding shoes with their clamping grooves are held snappingly on the projections. Also the position of the sliding shoes relative to the shutoff wedge is exactly predetermined, so that the sliding shoes prior to their spraying can lie centrally in the guiding grooves.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
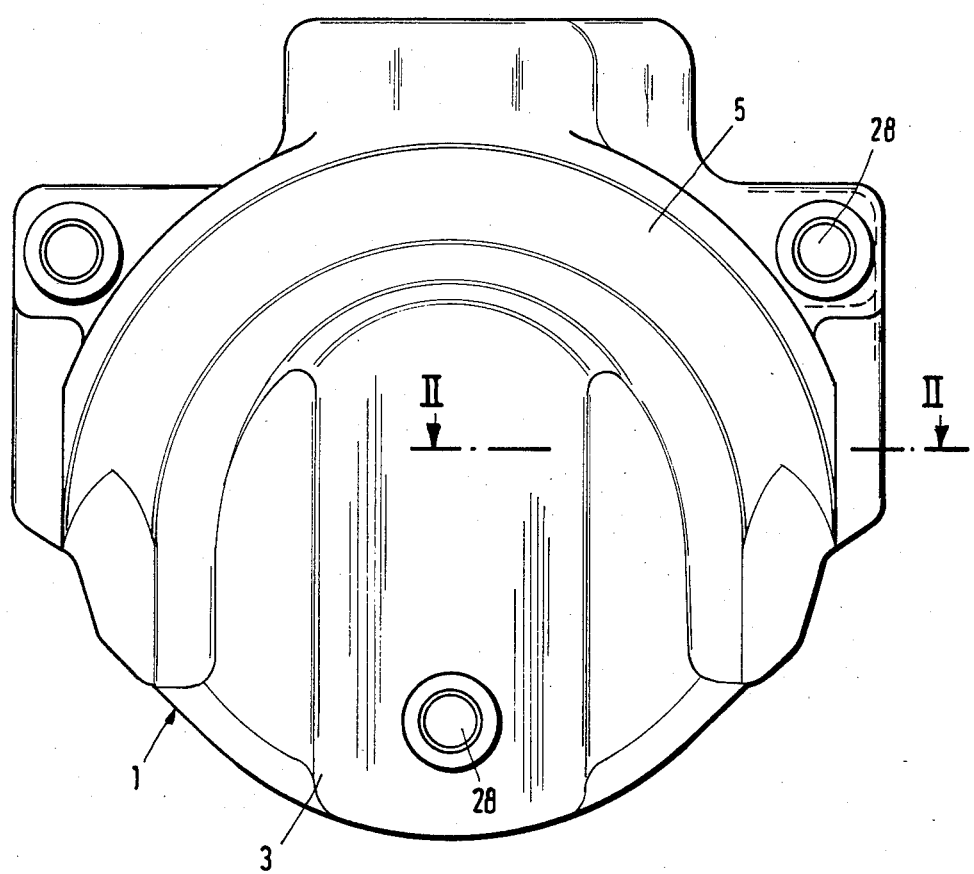
FIG. 1 is a view showing a shutoff wedge in accordance with the present invention, which holds sliding shoes as a rubber elastic jacket.
Figure 2:
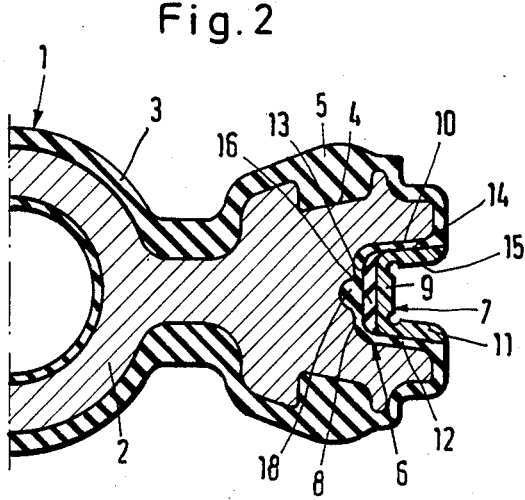
FIG. 2 is a view showing a section of the shutoff wedge taken along the line II—II in FIG. 1.
Figure 3:
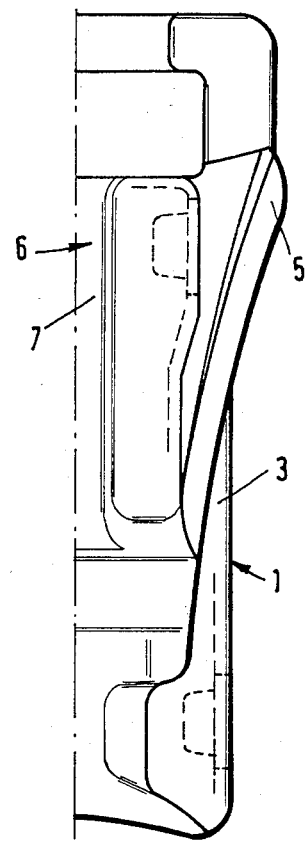
FIG. 3 is a side view of the shutoff wedge of FIGS. 1 and 2.
Figure 4:
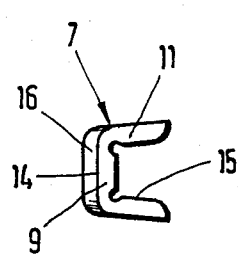
FIG. 4 is a plan view of the sliding shoe of the shutoff wedge.
Figure 5:
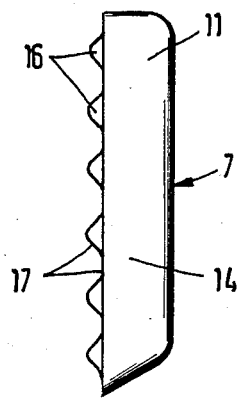
FIG. 5 is a side view of the sliding shoe of FIG. 4.
Figure 6:
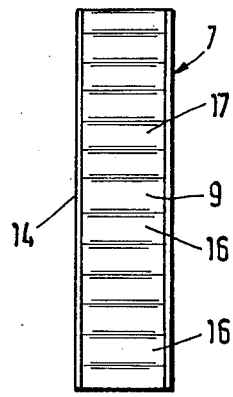
FIG. 6 is a rear view of the sliding shoe of FIGS. 4 and 5.
Figure 7:
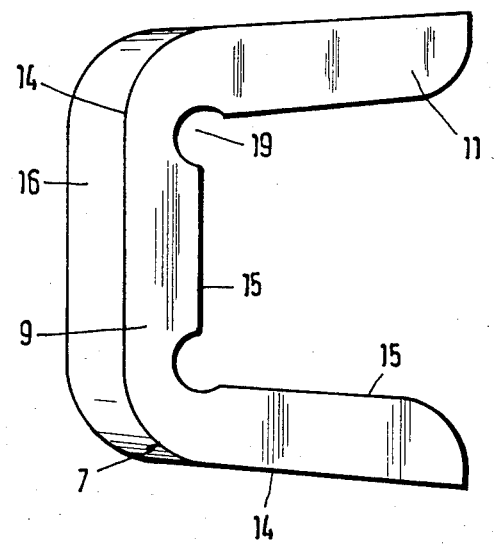
FIG. 7 is a view showing the sliding shoe of FIG. 4 on an enlarged scale.

FIGS. 1–3 show a rubberized shutoff wedge 1 which substantially includes a row cast iron body 2 and a rubber elastic jacket 3 sprayed on the body 2. In the region of sealing faces which cooperate with seat faces of a valve housing, the cast iron body 2 is provided with grooves 4, and the rubber elastic jacket 3 is here thickened in a bead-like manner, so that the shutoff wedge 1 has a soft-elastic sealing web 5. The row cast iron body 2 is provided at its both small sides with cast guiding grooves 6, in which synthetic plastic sliding shoes 7 are fixedly inserted.

Both synthetic plastic sliding shoes 7 are smaller in their cross-section than the cast guiding grooves 6. Therefore a gap remains between a bottom 8 of the guiding groove 6 and a bottom 9 of the sliding shoe 7, as well as in side walls 10 of the guiding grooves 6 and side walls 11 of the sliding shoes 7. The gap together forms a hollow chamber 12 which is filled during spraying of the rubber elastic jacket 3 by a spraying mass 13. After the vulcanization process for the rubber elastic jacket 3, the backing spraying mass 13 forms a firm elastic rubber layer by which outer faces 14 of the sliding shoe 7 are fixedly connected in the guiding grooves 6 with the cast iron body 2. The synthetic plastic sliding shoes 7 are sealingly surrounded by the rubber elastic jacket 3 up to their sliding faces 15 abutting against the guiding strips of the not shown valve housing. Therefore a seamless transisition is provided from the rubber elastic jacket 3 to the synthetic plastic sliding shoes 7 embedded in the filling layer 13.

As can be seen from FIGS. 4–7, the bottom 9 of the synthetic plastic sliding shoe 7 is provided with a plurality of holding transfer ribs 16. By these holding transverse ribs the sliding shoe is firmer embedded and anchored in the backing filling layer 13. In the region between the holding transverse rib 16, the synthetic plastic sliding shoe 7 has a rounded and inclined transition 17, for better flowing of the backing spraying mass 13 around the holding transverse rib 16. For providing a sufficient feeding channel for the backing spraying mass 13, the center of bottom 8 of the guiding grooves 6 has a small longitudinal groove 18 of semi-circular cross-section, cast in the row shutoff wedge 2, as can be seen from FIG. 2. For holding the sliding shoe 7 in the straight shape during the backing spraying process, the shoes are provided at their inner longitudinal edges with clamping grooves 19, in which the respective projections of the spraying mold can engage in a coupling manner.

Figure 8:
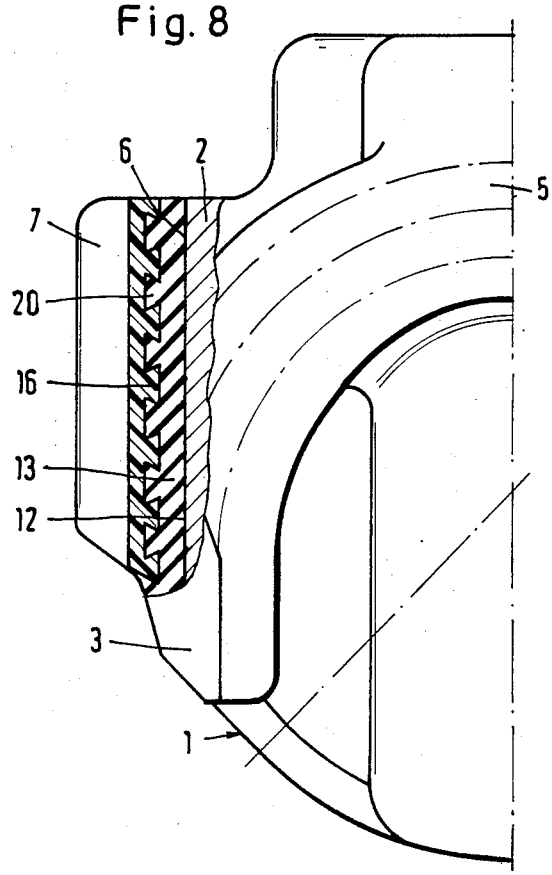
FIG. 8 is a view showing a shutoff wedge with another sliding shoe, partially in a longitudinal section.

FIG. 8 shows an another embodiment of the holding transverse ribs 16 of the sliding shoes 7. The intermediate spaces between the holding transverse ribs are formed as dove-tail shaped undercuts 20, so as to provide a firm anchoring of the sliding shoes 7 in the elastic connecting layers 13.

Figure 9:
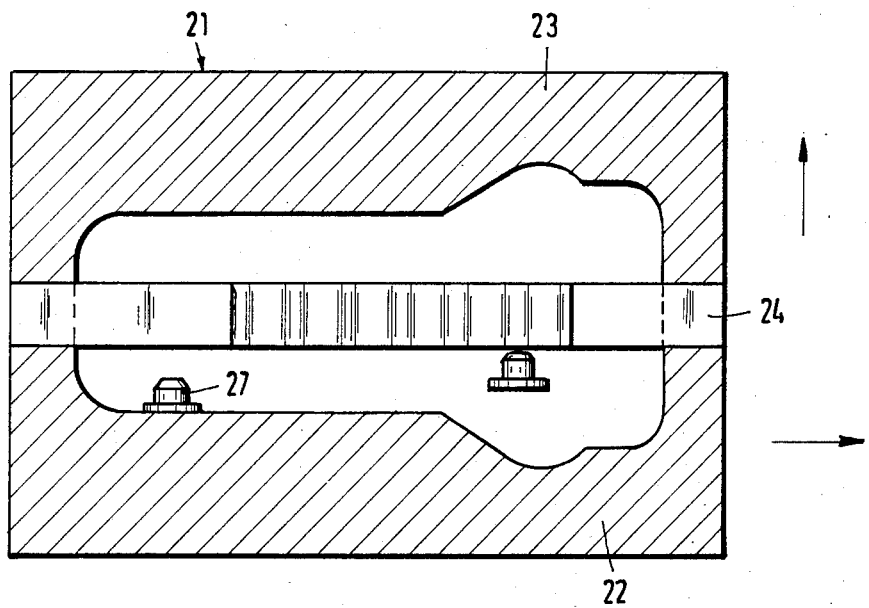
FIG. 9 is a view showing a section of closed spraying molds.

A spraying mold 21 shown in FIG. 9 includes a lower mold shell 22, an upper mold shell 23 and an intermediate part 24. Both mold shells 22 and 23 limit a half of the outer contour of the rubber elastic jacket 3 to be sprayed, of the shutoff wedge 1. The intermediate part 24 of the spraying mold 21 is formed stationary, whereas the upper mold shell 23 is removable upwardly for insertion of the shutoff wedge. The lower mold shell 22 is displaced for insertion of the shutoff valve, in the direction of the arrow parallel to the stationary intermediate part 24.

Figure 10:
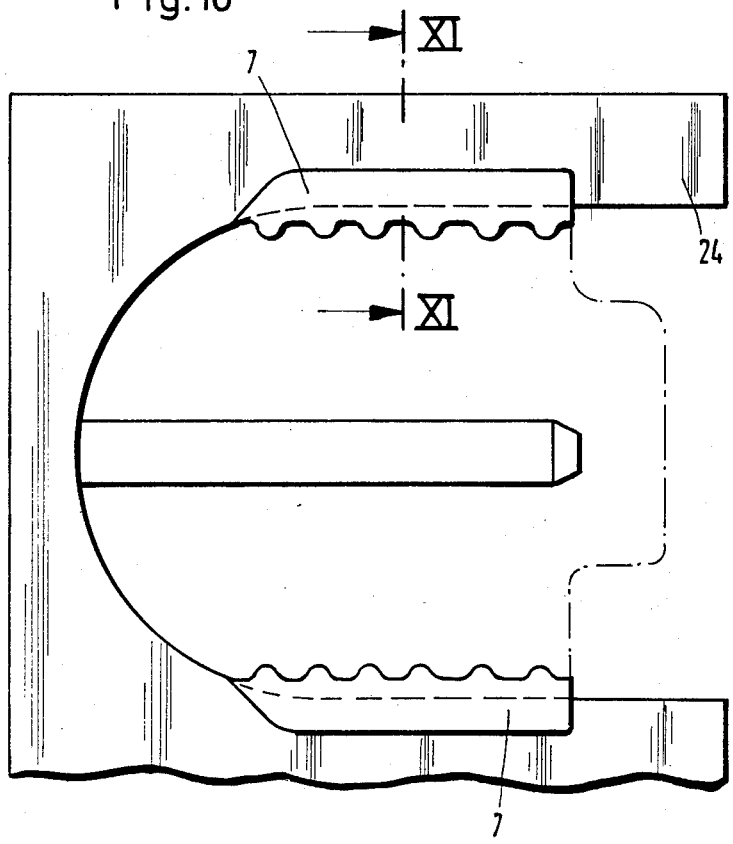
FIG. 10 is a plan view of a central part of the spraying mold, holding the sliding shoe.
Figure 11:
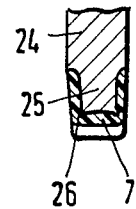
FIG. 11 is a view showing a section through the holding strip, taken along the line XI—XI in FIG. 10, with inserted sliding shoe.

As can be seen from FIGS. 10 and 11, the stationary intermediate part 24 is provided with holding strips 25, on which the sliding shoes 7 are clamped. For this purpose, the holding strips 25 are provided with projections 26 which engage in a coupling manner in the clamping grooves of the sliding shoes 7.

Figure 12:
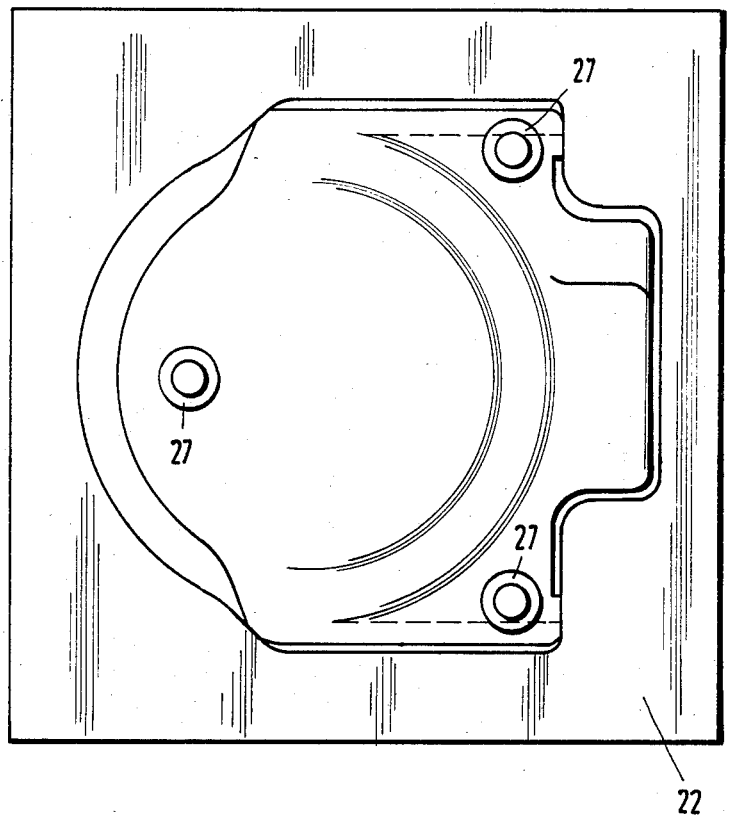
FIG. 12 is a plan view of a lower mold shell with with centering pins.
Figure 13:
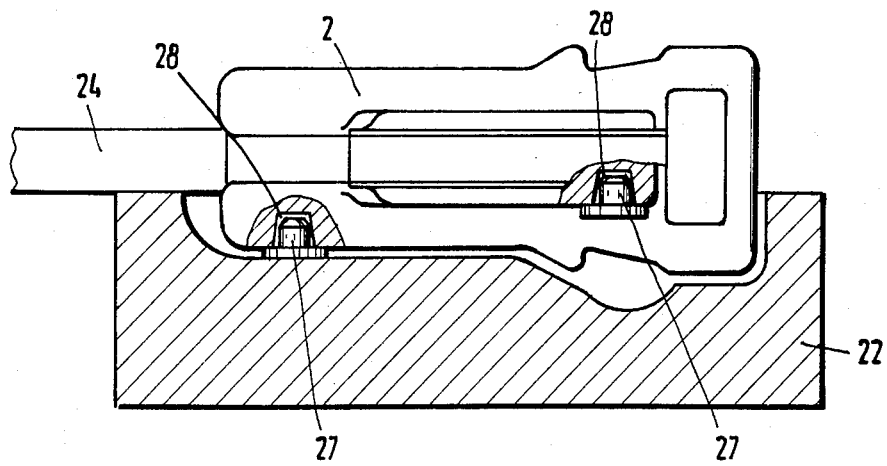
FIG. 13 is a view showing a lower mold shell in section with inserted row shutoff wedge.

FIG. 12 shows the lower mold shell 22 with mold depressions for the elastic jacket to be sprayed in a plan view, as well as the arrangement of three centering pins 27 provided for position fixation of the insertable shutoff valve. While FIG. 12 shows the empty mold halves without a shutoff valve, the row cast shutoff valve 2 is inserted in FIG. 13 into the lower mold half 22 removed from the spraying mold 21. The centering pins 27 engage in centering blind holes 28 provided in the shutoff wedge and fix thereby the position of the shutoff valve both relative to the elastic jacket 3 and also relative to the sliding shoes 7 inserted in the intermediate part 24. Because of this position fixation of the row shutoff valve 2, the sliding shoes 7 fixed positionally in the intermediate part 24 lie centrally in the guiding grooves 6 of the shutoff wedge during insertion of the lower mold shell 22 in the spraying mold 21.

It will be understood that each of the elements described above, or two or more together, may also find a useful application in other types of constructions differing from the types described above.

While the invention has been illustrated and described as embodied in a shutoff wedge for a shutoff valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A shutoff wedge for a shutoff valve, comprising a row cast iron body with guiding grooves arranged to surround respective guiding strips of a valve housing, each of said guiding grooves having a bottom and two lateral walls; a rubber elastic jacket provided on said row cast iron body having sealing face portion arranged to lie elastically against seat faces of the valve housing; two U-shaped sliding shoes having sliding faces and composed of synthetic plastic material with good sliding properties, high wear resistance and sufficient temperature strength, the U-shaped sliding shoes being firmly inserted in said guiding grooves of said row cast iron body which is tightly surrounded by said rubber elastic jacket up to said sliding faces, each of said U-shaped sliding shoes being arranged in respective one of said guiding grooves so that a gap is formed between said bottom and said both lateral walls of each guiding groove, to form a hollow space between said sliding shoes and said guiding grooves; and a spraying mass which fills said remaining hollow space between said sliding shoes and said guiding grooves.

2. A shutoff wedge as defined in claim 1, wherein U-shaped sliding shoe is composed of polyamide.

3. A shutoff wedge as defined in claim 1, wherein said spraying mass is formed of said rubber elastic jacket.

4. A shutoff wedge as defined in claim 1, wherein said synthetic plastic sliding shoe has a bottom and lateral walls with a side facing toward said cast iron body, at least one of said bottom and said lateral walls of said synthetic plastic sliding shoe being provided with a plurality of holding ribs extending transverse to a longitudinal axis and fixedly anchored in said spraying mass.

5. A shutoff wedge as defined in claim 4, wherein said holding ribs are provided both on said bottom and on said lateral walls of said synthetic plastic sliding shoes.

6. A shutoff wedge as defined in claim 4, wherein said synthetic plastic sliding shoe has a transition provided outwardly in the region between said holding ribs.

7. A shutoff wedge as defined in claim 6, wherein said transition is rounded.

8. A shutoff wedge as defined in claim 6, wherein said transition is inclined.

9. A shutoff wedge as defined in claim 4, wherein said holding ribs are arranged so that the spaced therebetween formed as dove-tail shaped undercuts.

10. A shutoff wedge as defined in claim 1, wherein said guiding grooves have a bottom with a bottom center provided with a small longitudinal groove which forms a feeding passage for said spraying mass.

11. A shutoff wedge as defined in claim 1, wherein said synthetic plastic sliding shoe has an inner longitudinal edge and is provided at said inner longitudinal edge with clamping grooves.

12. A shutoff wedge as defined in claim 11, wherein said clamping groove has a cross-section which insignificantly exceeds a semi-circle.

13. A shutoff wedge as defined in claim 1, wherein said row cast iron body has centering blind holes arranged for position fixing of said cast iron body and said synthetic plastic sliding shoes during spraying of said spraying mass.

14. A shutoff wedge as defined in claim 13, wherein said row cast iron body has a wide side and is provided at its wide side with three such centering blind holes.

* * * * *